(12) United States Patent
Lee et al.

(10) Patent No.: US 6,233,141 B1
(45) Date of Patent: May 15, 2001

(54) SECURING STRUCTURE FOR THE BATTERY CARTRIDGE OF A NOTEBOOK-TYPE COMPUTER

(75) Inventors: Chia-Chun Lee; Ming-Hsun Chou; Jui-Jung Huang, all of Taipei (TW)

(73) Assignee: Compal Electronics Inc., Taipei (TW)

( * ) Notice: Subject to any disclaimer, the term of this patent is extended or adjusted under 35 U.S.C. 154(b) by 0 days.

(21) Appl. No.: 09/237,658

(22) Filed: Jan. 27, 1999

(51) Int. Cl.[7] .................................................. G06F 1/16
(52) U.S. Cl. .................... 361/683; 361/801; 361/725; 429/123; 439/342
(58) Field of Search ................................. 361/683, 801, 361/724–727; 429/96–100; 439/342, 347

(56) References Cited

U.S. PATENT DOCUMENTS

| | | | |
|---|---|---|---|
| 5,208,116 | * | 5/1993 | Joh ............................................ 429/96 |
| 5,677,827 | * | 10/1997 | Yoshioka et al. ..................... 361/683 |
| 5,729,478 | * | 3/1998 | Ma et al. ................................ 361/683 |
| 5,882,220 | * | 3/1999 | Horii et al. ............................ 439/297 |

* cited by examiner

*Primary Examiner*—Leo P. Picard
*Assistant Examiner*—Hung Van Duong
(74) *Attorney, Agent, or Firm*—Bacon & Thomas, PLLC (57) ABSTRACT

A securing structure for the battery cartridge of a notebook-type computer directly connects the battery cartridge on one side of the computer. One side of the computer is formed with a recess in which a first electrical connection seat is disposed. At least one movable latch body is disposed on a periphery of the recess. The battery cartridge is disposed with a second electrical connection seat for electrically connecting with the first electrical connection seat. After the battery cartridge is connected with the computer, the movable latch body is shifted to engage with the second electrical connection seat so as to firmly connect the second electrical connection seat with the first electrical connection seat. In addition, another battery cartridge can be connected with the battery cartridge for expanding the power supply of the computer.

18 Claims, 11 Drawing Sheets

SECURING STRUCTURE FOR THE BATTERY CARTRIDGE OF A NOTEBOOK-TYPE COMPUTER

BACKGROUND OF THE INVENTION

The present invention relates to a securing structure for the battery cartridge of a notebook-type computer, which directly connects the battery cartridge on one side of the computer. Another battery cartridge can be additionally connected with the battery cartridge for expanding the power supply of the computer.

Figure 1:
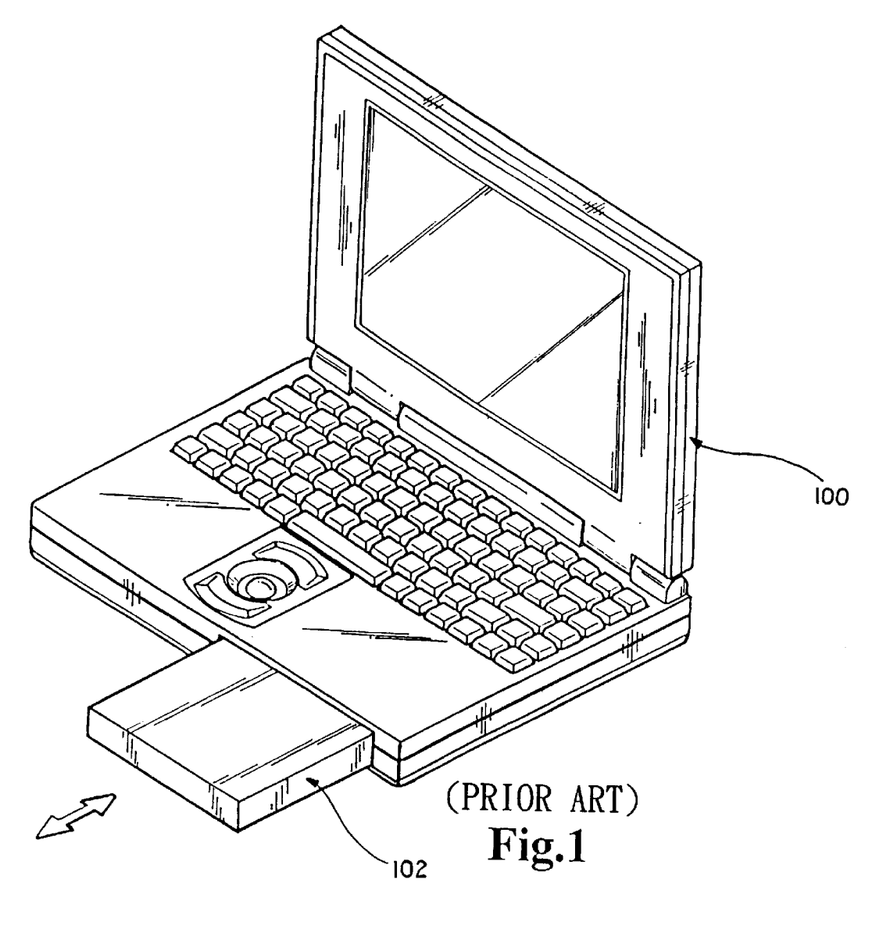
FIG. 1 is a perspective view showing a conventional securing structure for connecting a battery cartridge with a notebook-type computer.
Figure 2:
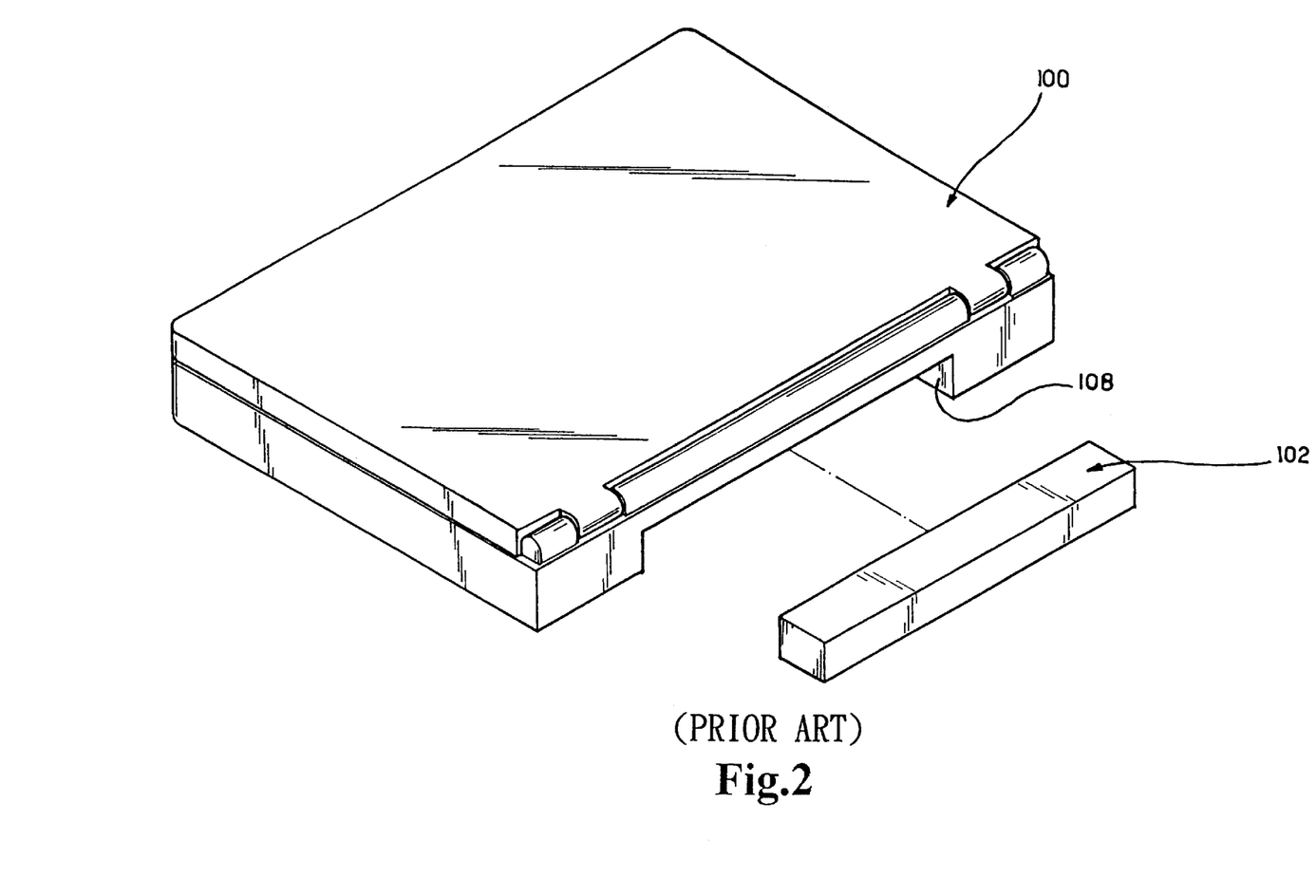
FIG. 2 is a perspective view showing another conventional securing structure for connecting a battery cartridge with a notebook-type computer.
Figure 3:
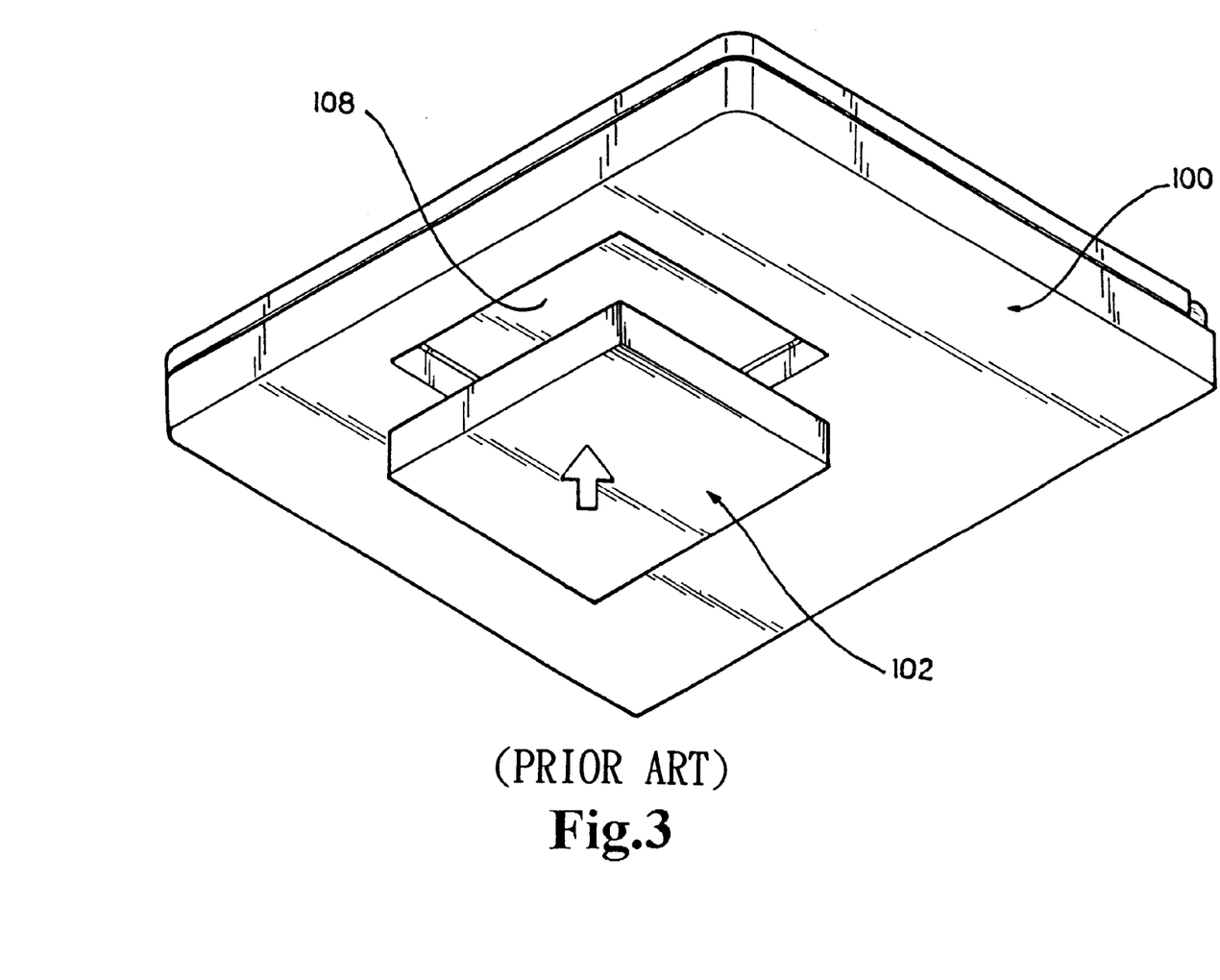
FIG. 3 is a perspective view showing still another conventional securing structure for connecting a battery cartridge with a notebook-type computer.

FIG. 1 shows the connection between a notebook-type computer 100 and a battery cartridge 102. Referring to FIGS. 2 and 3, a lateral side or a bottom side of the notebook-type computer 10 is formed with a receptacle 108 for receiving therein a battery cartridge 102. Such receptacle 108 will occupy the thickness of one side of the computer 100. Moreover, since the battery cartridge 102 is received in the receptacle 108 of the computer 100, the thickness of the battery cartridge 102 is limited and cannot be equal to the thickness of the computer 100. As a result, the capacity of the battery cartridge 102 is reduced due to the limitation of thickness. Also, since the battery cartridge 102 is received inside the computer 100, it is impossible to connect the computer with another battery cartridge 102 for expansion.

SUMMARY OF THE INVENTION

It is a primary object of the present invention to provide a securing structure for the battery cartridge of a notebook-type computer. The securing structure enables the battery cartridge to be directly connected to one side as to the the computer without limitation of thickness of the battery cartridge due to limited space inside the notebook-type computer. Moreover, since the battery cartridge is connected to an outer side of the computer, another battery cartridge can be additionally connected with the battery cartridge for expanding the power supply for the computer.

The present invention can be best understood through the following description and accompanying drawings, wherein:

DETAILED DESCRIPTION OF THE PREFERRED EMBODIMENTS

Figure 4:
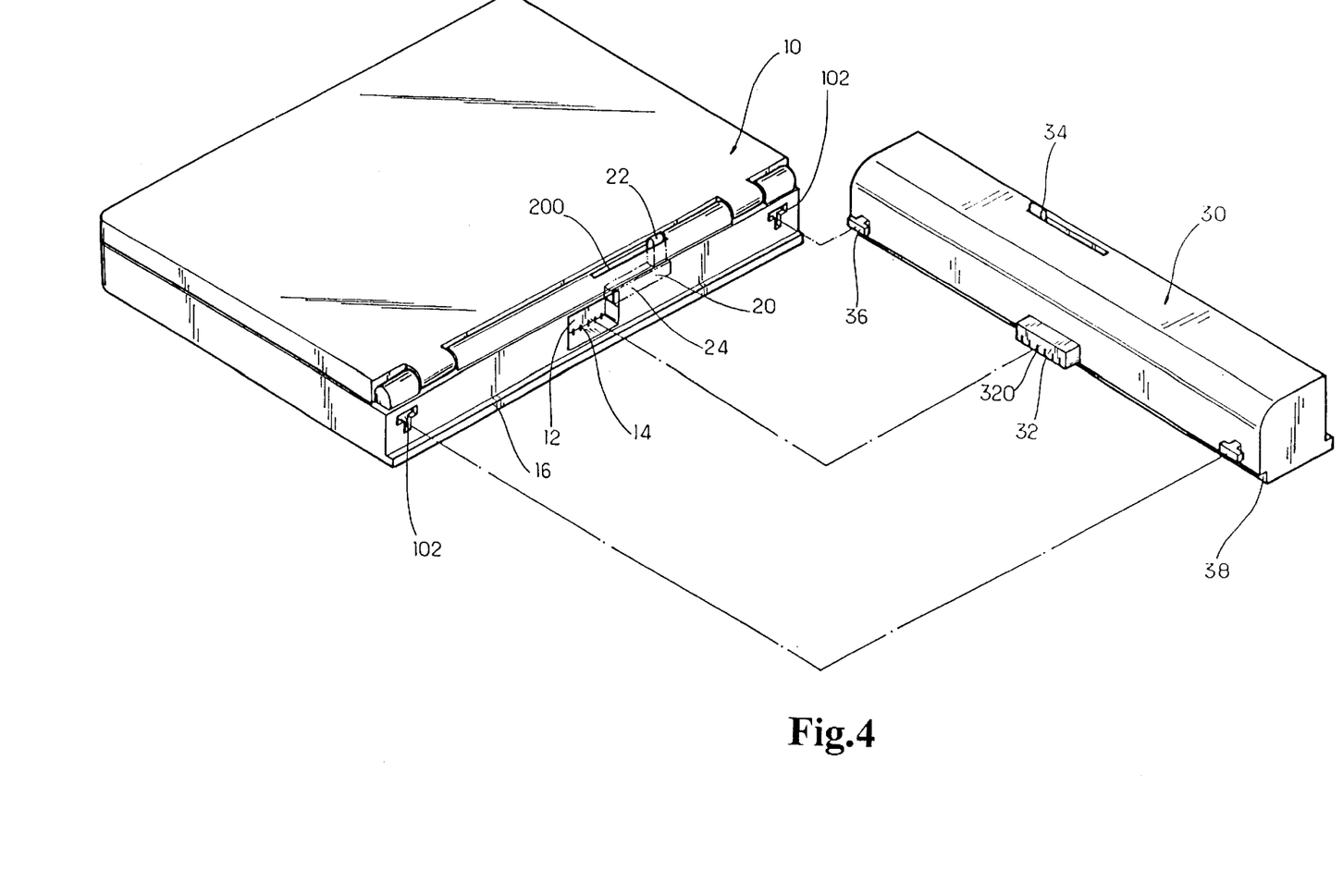
FIG. 4 is a perspective exploded view of the securing structure for the battery cartridge of the notebook-type computer of the present invention.

Please refer to FIG. 4. According to the battery cartridge securing structure of the present invention, one side of the notebook-type computer 10 is formed with a recess 12 in which a first electrical connection seat 14 is disposed. A movable latch body 20 is disposed on a periphery of the recess 12. In the embodiment of FIG. 4, the first electrical connection seat 14 projects from the bottom of the recess 12. The movable latch body 20 is pivotally disposed in the space of one side of the recess 12. The movable latch body 20 is composed of a shifting section 22 and a latch board body 24. The shifting section 22 projects out of a slot 200 of the computer 100 and is slidable to an upper side of the recess 12 along the slot 200.

A battery cartridge 30 for receiving a battery is electrically connected with the computer 10. One side of the battery cartridge 30 is disposed with a second electrical connection seat 32 for electrically connecting with the first electrical connection seat 14. In this embodiment, the second electrical connection seat 32 projects from one side of the battery cartridge 30. A lower side of the second electrical connection seat 32 is formed with sockets 320 for electrically connecting with the first electrical connection seat 14.

Figure 5:
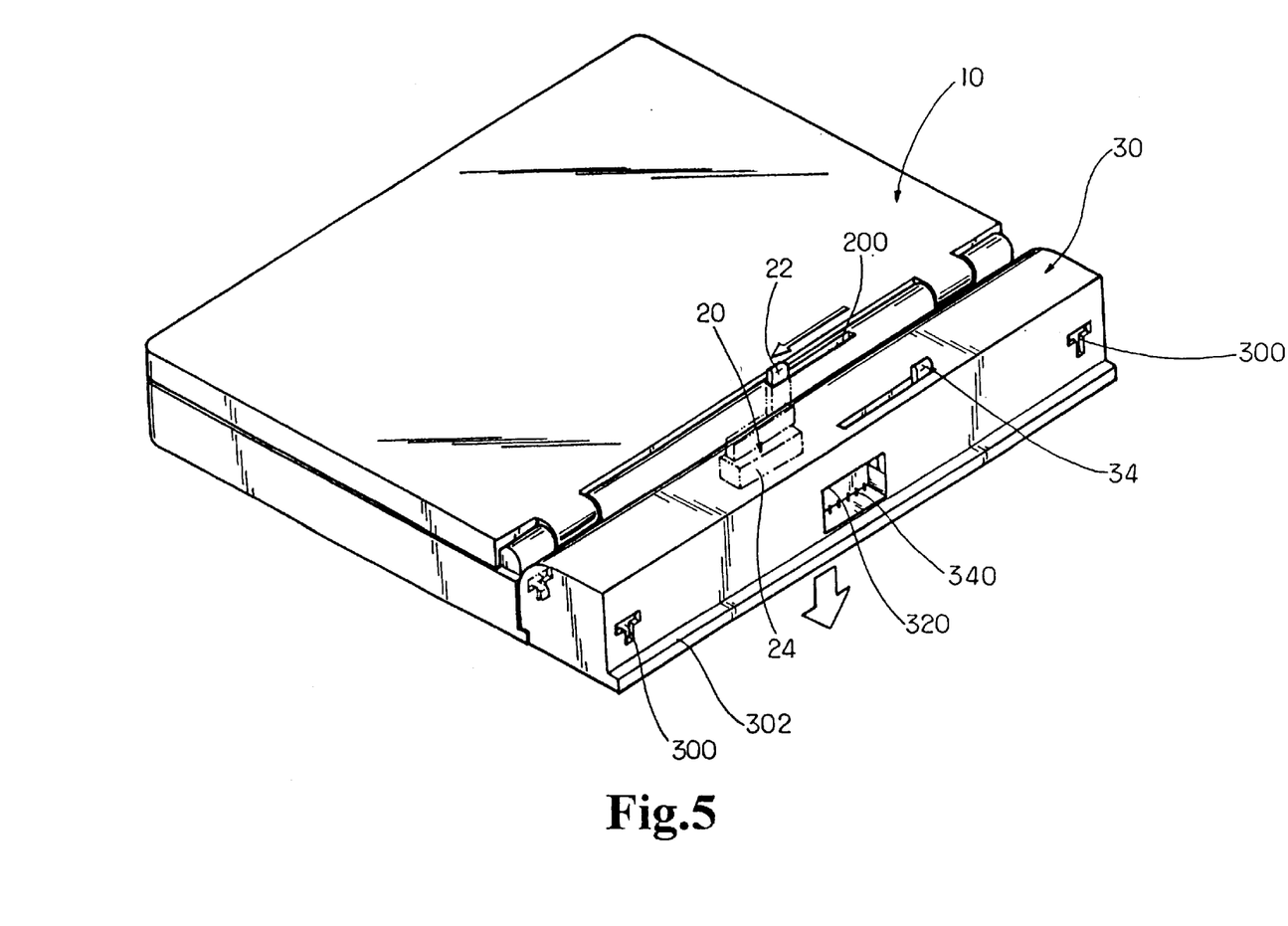
FIG. 5 is a perspective assembled view of the securing structure for the battery cartridge of the notebook-type computer of the present invention.
Figure 6:
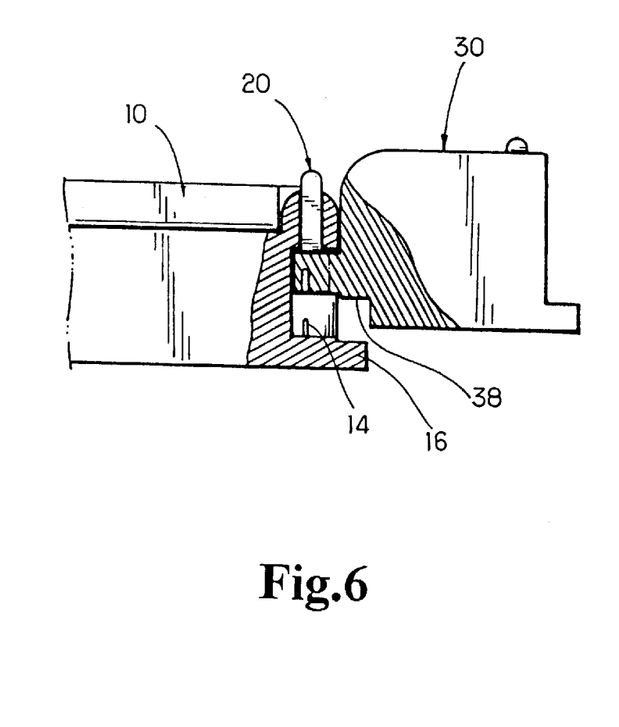
FIG. 6 is a sectional assembled view of the securing structure for the battery cartridge of the notebook-type computer of the present invention, in which the latch body is not shifted to lock the battery cartridge.
Figure 7:
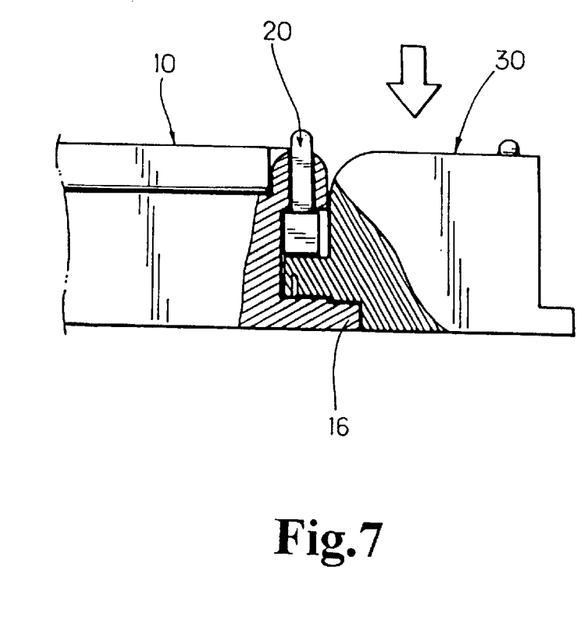
FIG. 7 is a sectional assembled view of the securing structure for the battery cartridge of notebook-type computer of the present invention, in which the latch body is shifted to lock the battery cartridge.

Please refer to FIG. 5. The thickness of the second electrical connection seat 32 is less than the height of the recess 12. After the second electrical connection seat 32 is inserted into and electrically connected with the first electrical connection seat 14, a space remains on the upper side of the recess 12. Referring to FIGS. 6 and 7, when the shifting section 22 is shifted along the slot 200 to the upper side of the recess 12, the latch board body 24 will occupy the upper side space of the recess 12 to engage with and locate the second electrical connection seat 32. In addition, in order to enhance the connection force between the battery cartridge 30 and the computer 10, the bottom of one side of the computer 10 is formed with a flange section 16 and the battery cartridge 30 is formed with a recess 38 corresponding to the flange 16. After the battery cartridge 30 is assembled with the computer 10, the flange 16 is engaged in the recess 12 so as to enhance the insertion force between the battery cartridge 30 and the computer 10.

Figure 8:
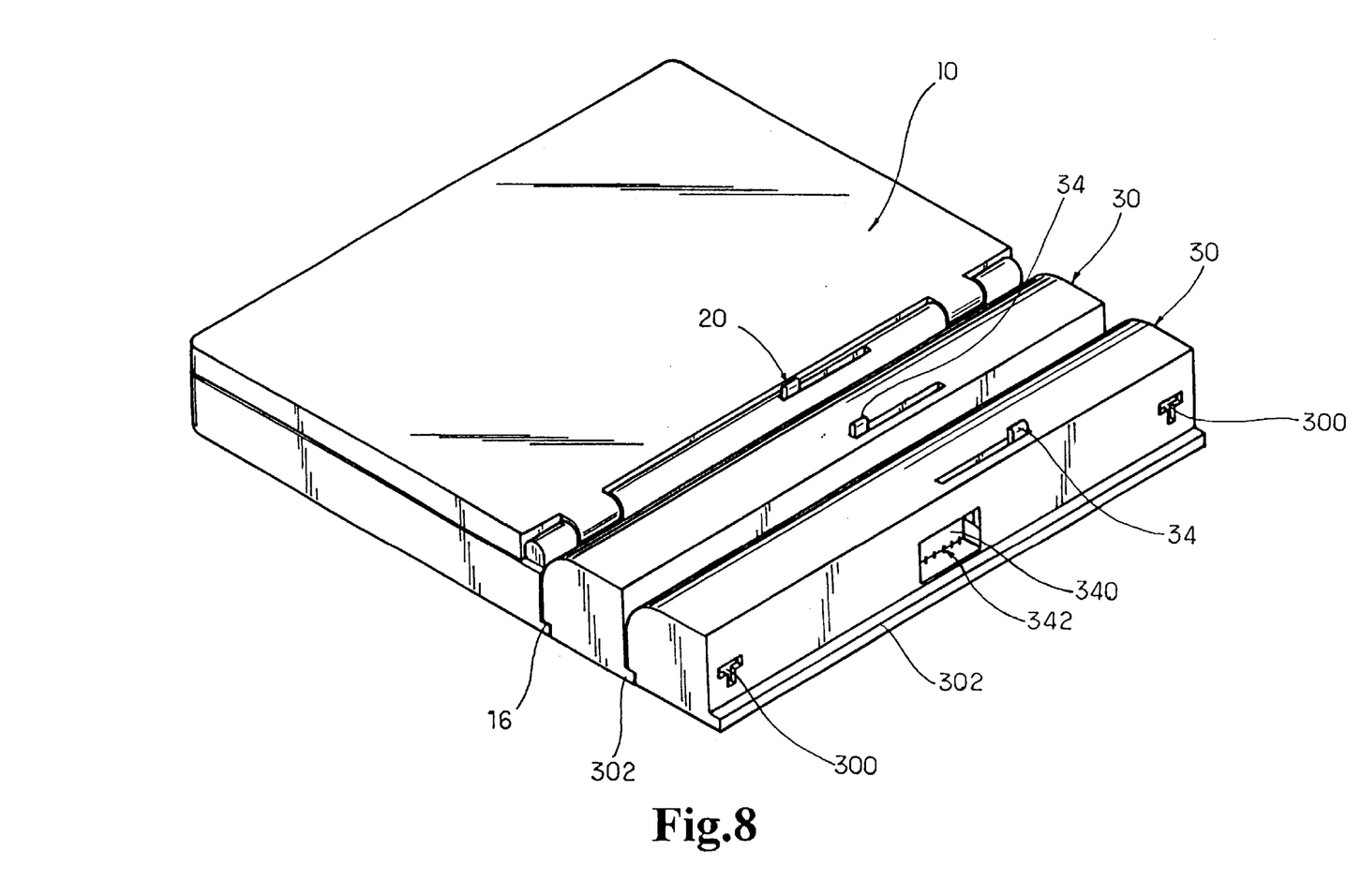
FIG. 8 shows that two battery cartridges are connected with the notebook-type computer.

Referring to FIG. 8, the other side of the battery cartridge 30 opposite to the second electrical connection seat 32 is formed with a recess 340 in which a third connection seat 342 is disposed for electrically connecting with a second electrical connection seat 32 of a battery cartridge 30. At least one movable latch body 34 is disposed on a periphery of the recess 340. Accordingly, after the battery cartridge 30 is connected with the computer 10, another battery cartridge 30 can be further connected with the battery cartridge 30 to expand the power supply carried by the computer 10.

Furthermore, in order to enhance the connection force between the battery cartridge 30 and the computer 10, each lateral side of the computer 10 is disposed with a first latch section 102 and the battery cartridge 30 is disposed with a second latch section 36 corresponding to the first latch section 102 so as to enhance the connection between the battery cartridge 30 and the computer 10.

Figure 9:
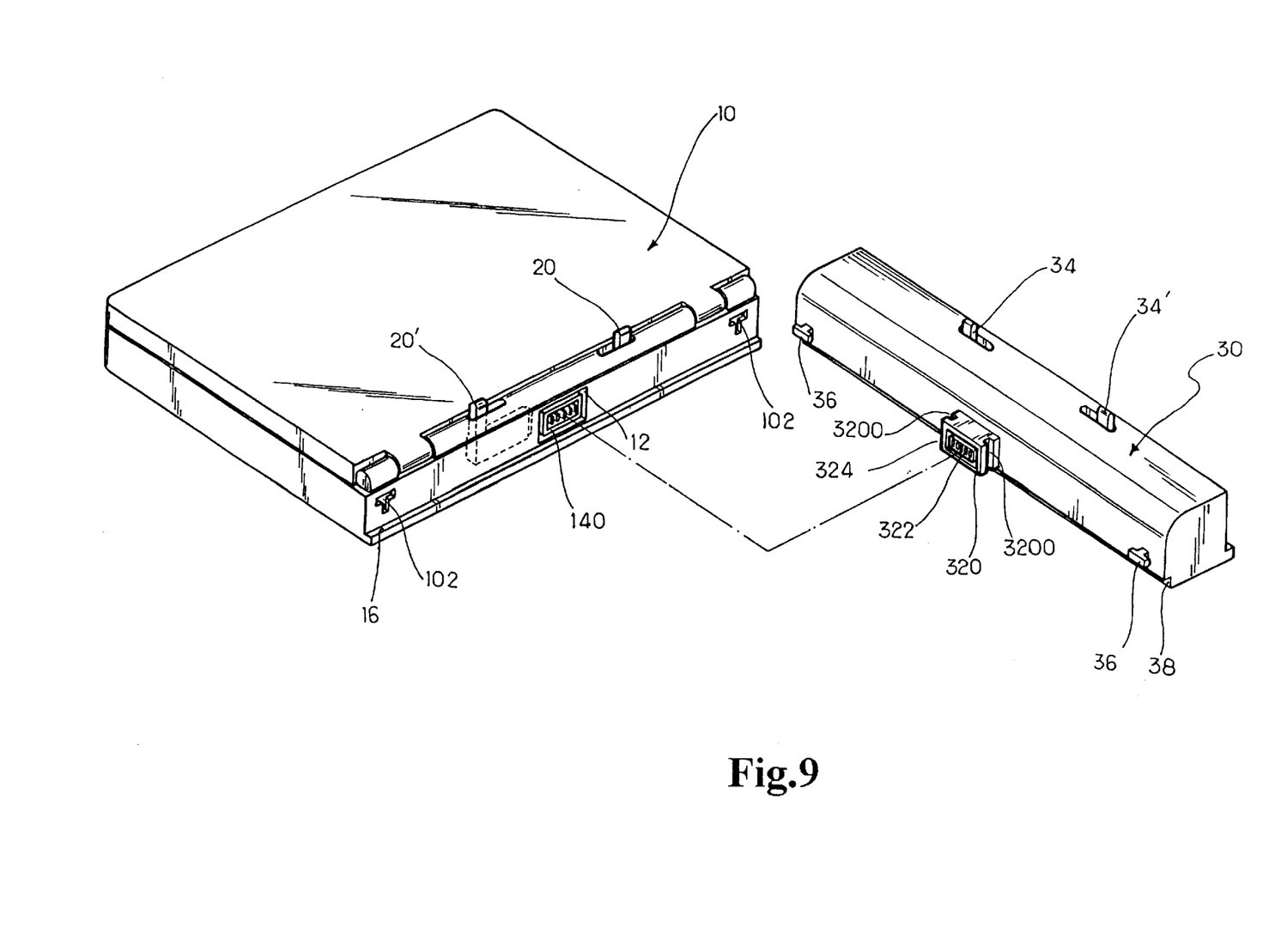
FIG. 9 is a perspective exploded view of another embodiment of the securing structure for the battery cartridge of the notebook-type computer of the present invention.
Figure 10:
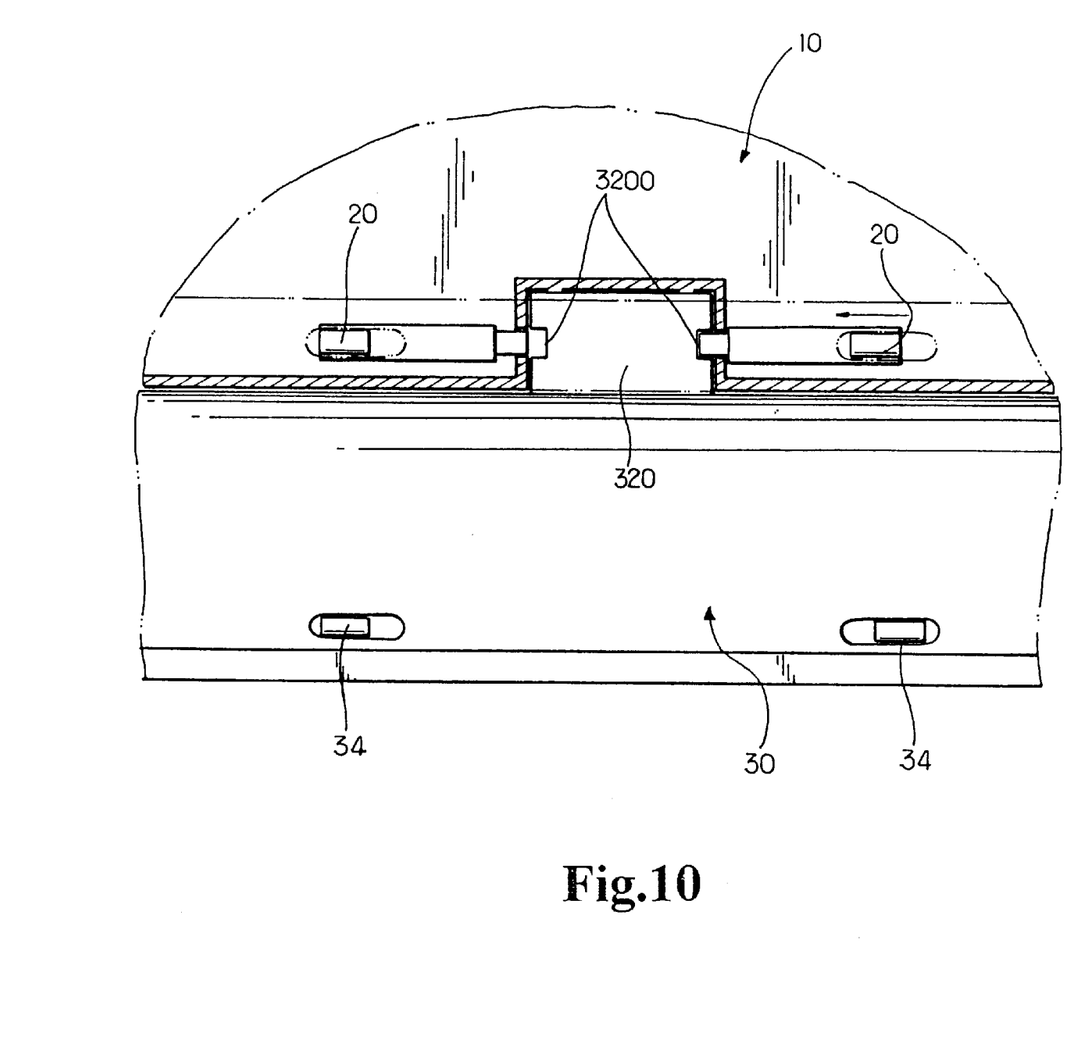
FIG. 10 is a sectional view of a part of the embodiment of FIG. 9.

FIG. 9 shows another embodiment of the present invention. The first electrical connection seat 14 projects from a lateral face of the recess 12. Two movable latch bodies 20, 20' are respectively disposed on the computer 10 beside the recess 12. The movable latch body 20 is structurally identical to the movable latch body of the above embodiment. One side of the battery cartridge 30 is disposed with a second electrical connection seat 32. In this embodiment, a fitting body 320 is disposed on the outer periphery of the second electrical connection seat 32. At least one channel 3200 is formed on the outer face of the fitting body 320. A gap 324 is defined between the second electrical connection seat 32 and the fitting body 320 for fitting the second electrical connection seat 32 with the first electrical connection seat 14. Referring to FIG. 10, after the second electrical connection seat 32 is inserted with the first electrical connection seat 14, the latch board body 24 of the movable latch body 20 is shifted to latch in the channel 3200 so as to secure the battery cartridge 30 on the computer 10.

Figure 11:
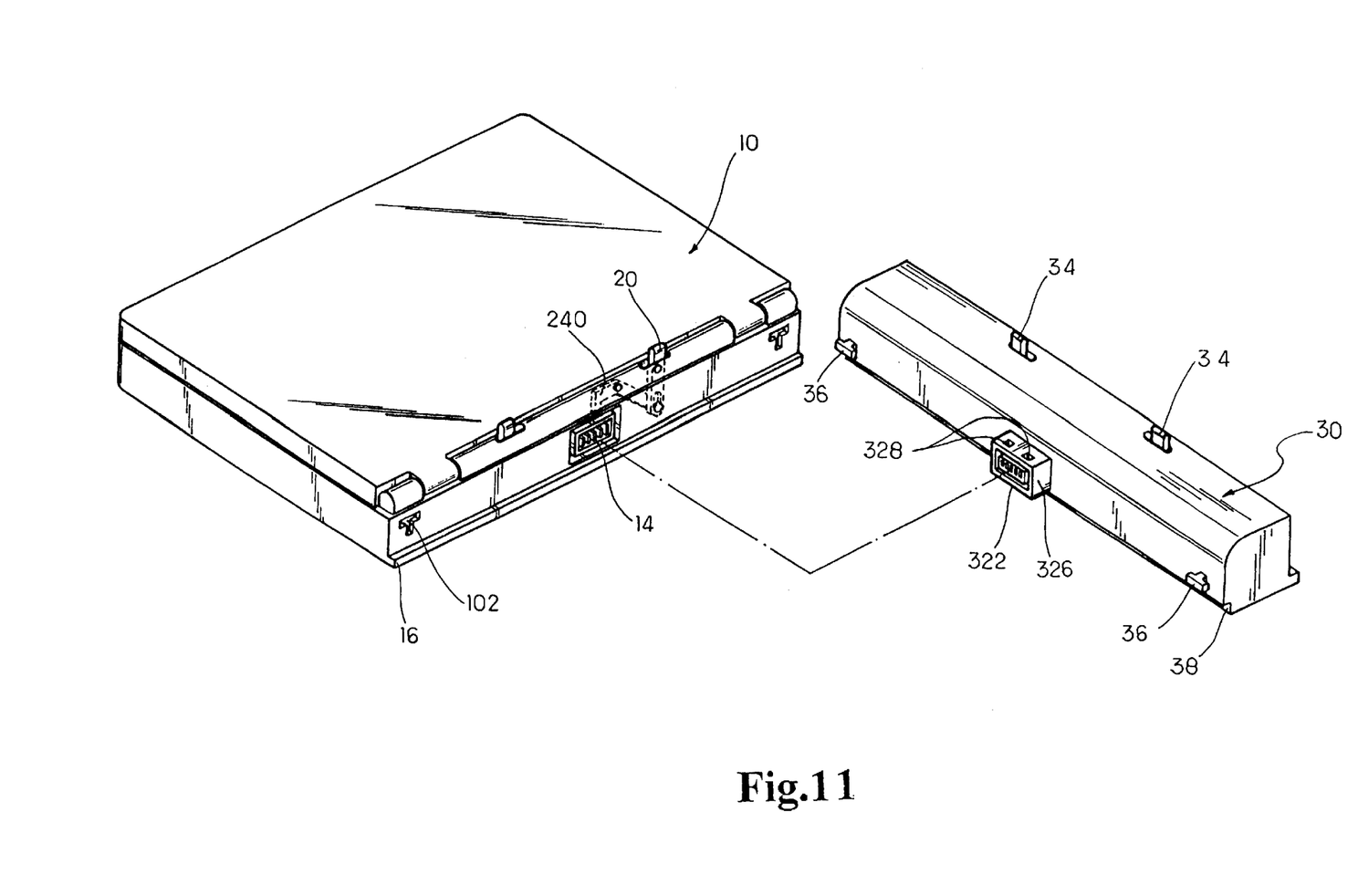
FIG. 11 is a perspective exploded view of still another embodiment of the securing structure for the battery cartridge of the notebook-type computer of the present invention.
Figure 12:
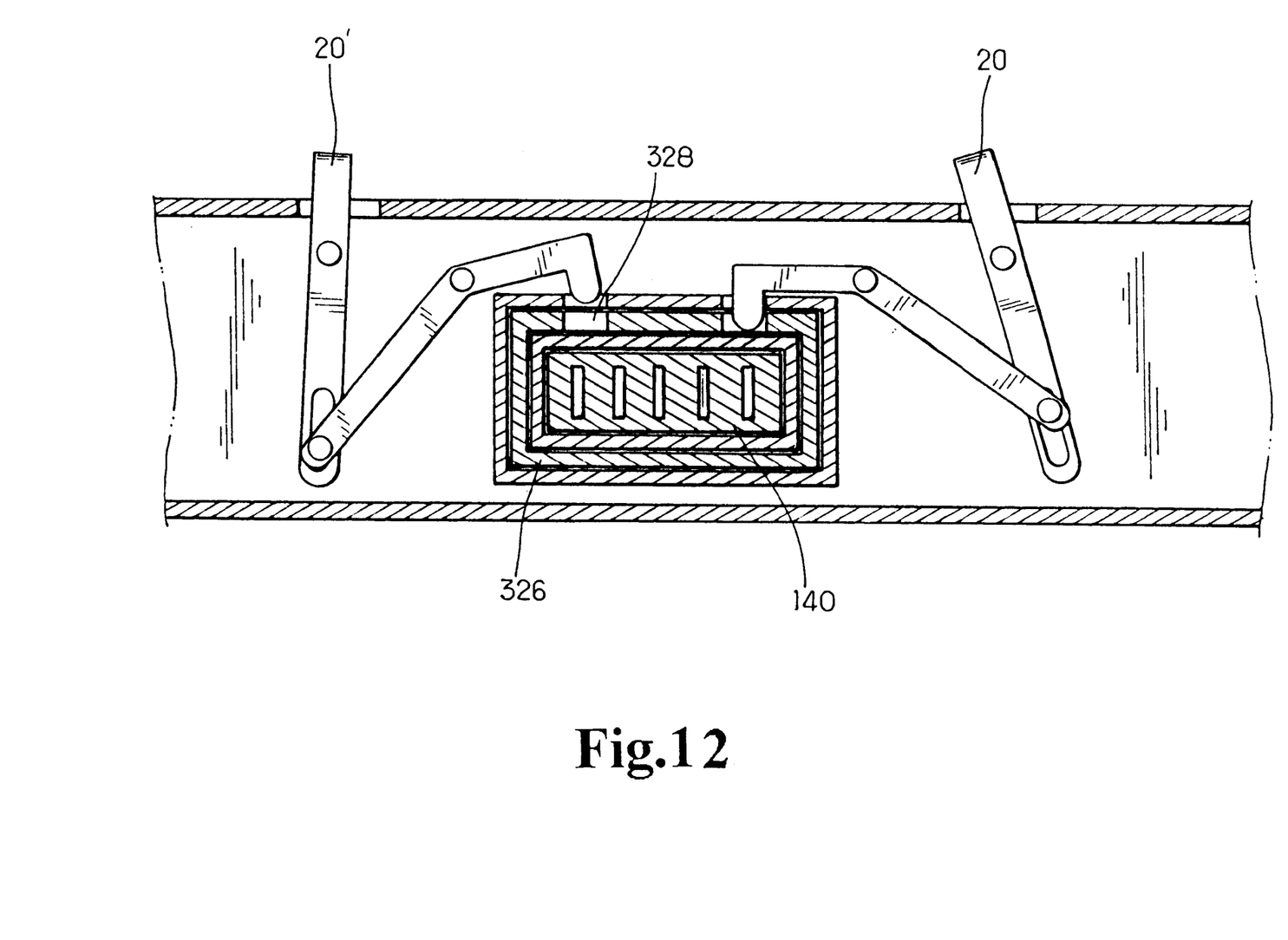
FIG. 12 is a sectional view of a part of the embodiment of FIG. 11.

FIG. 11 shows still another embodiment of the present invention. The first electrical connection seat 14 is disposed on a lateral face of the recess 12. The second electrical connection seat 32 projects from a lateral side of the battery cartridge 30. The second electrical connection seat 32 is electrically connected with the first electrical connection seat 14 in a face-to-face manner. A fitting body 326 is disposed on the outer periphery of the second electrical connection seat 32. An upper edge of the fitting body 326 is formed with at least one fixing hole 328. The movable latch body 20 is disposed with a hook section 240 having an extending shifting section 242. Referring to FIG. 12, after the second electrical connection seat 32 is inserted into the first electrical connection seat 14, the hook section 240 is shifted to engage in the fixing hole 328 so as to firmly secure the second electrical connection seat 32 in the recess 12.

It should be noted that the above description and accompanying drawings are only used to illustrate some embodiments of the present invention, not intended to limit the scope thereof. Any modification of the embodiments should fall within the scope of the present invention.

What is claimed is:

1. A securing structure for the battery cartridge of a notebook-type computer, comprising:
   a notebook-type computer one side of which is formed with a first recess in which a first electrical connection seat is disposed, at least one movable latch body being disposed on a periphery of the first recess; and
   a battery cartridge for receiving a battery and supplying power for the computer, one side of the battery cartridge being disposed with a second electrical connection seat for electrically connecting with the first electrical connection seat, whereby after the battery cartridge is connected with the computer, the movable latch body is shifted to engage with the second electrical connection seat so as to firmly connect the second electrical connection seat with the first electrical connection seat, and
   wherein the bottom side of one side of the computer is formed with a flange section and the battery cartridge is formed with a second recess corresponding to the flange section, whereby after the battery cartridge is assembled with the computer, the flange is engaged in the second recess so as to enhance the insertion force between the battery cartridge and the computer.

2. A securing structure for the battery cartridge of a notebook-type computer as claimed in claim 1, wherein the first electrical connection seat is disposed on the bottom of the first recess and the second electrical connection seat projects from a lateral side of the battery cartridge for electrically connecting with the first electrical connection seat in a vertically fitting manner, whereby after the second electrical connection seat is electrically connected with the first electrical connection seat, a gap is defined on an upper side of the second electrical connection seat, the movable latch body being composed of a latch board body and a shifting section above the latch board body, whereby when the latch board body is shifted by the shifting section to the gap on the upper side of the second electrical connection seat, the second electrical connection seat is firmly secured in the first recess.

3. A securing structure for the battery cartridge of a notebook-type computer as claimed in claim 1, wherein the first electrical connection seat is disposed on a lateral face of the first recess and the second electrical connection seat projects from a lateral side of the battery cartridge for electrically connecting with the first electrical connection seat in a face-to-face manner, a fitting body being disposed on an outer periphery of the second electrical connection seat, at least one channel being formed on an outer face of the fitting body, the movable latch body being composed of a latch board body and a shifting section above the latch board body, whereby after the second electrical connection seat is electrically connected with the first electrical connection seat, the latch board body is shifted by the shifting section to engage in the channel so that the second electrical connection seat is firmly secured in the first recess.

4. A securing structure for the battery cartridge of a notebook-type computer as claimed in claim 1, wherein the first electrical connection seat is disposed on a lateral face of the first recess and the second electrical connection seat projects from a lateral side of the battery cartridge for electrically connecting with the first electrical connection seat in a face-to-face manner, a fitting body being disposed on an outer periphery of the second electrical connection seat, at least one fixing hole being formed on an upper edge of the fitting body, the movable latch body being disposed with a hook section having an extending shifting section, whereby after the second electrical connection seat is electrically connected with the first electrical connection seat, the hook section is shifted to engage in the fixing hole so that the second electrical connection seat is firmly secured in the first recess.

5. A securing structure for the battery cartridge of a notebook-type computer, comprising:
   a notebook-type computer one side of which is disposed with a first electrical connection seat; and
   a battery cartridge for receiving a battery and supplying power for the computer, one side of the battery cartridge being formed with a first recess in which a second electrical connection seat is disposed for electrically connecting with the first electrical connection seat, at least one first movable latch body being disposed on a periphery of the first recess, whereby after the battery cartridge is connected with the computer, the first movable latch body is shifted to engage with the second electrical connection seat so as to firmly connect the second electrical connection seat with the first electrical connection seat, and wherein the bottom side of one side of the computer is formed with a flange section and the battery cartridge is formed with a second recess corresponding to the flange section, whereby after the battery cartridge is assembled with the computer, the flange is engaged in the second recess so as to enhance the insertion force between the battery cartridge and the computer.

6. A securing structure for the battery cartridge of a notebook-type computer as claimed in claim 5, wherein the second electrical connection seat is disposed on the bottom of the first recess and the first electrical connection seat projects from a lateral side of the battery cartridge for electrically connecting with the second electrical connection seat in a vertically fitting manner, whereby after the first electrical connection seat is electrically connected with the second electrical connection seat, a gap is defined on an upper side of the first electrical connection seat, the movable latch body being composed of a latch board body and a shifting section above the latch board body, whereby when the latch board body is shifted by the shifting section to the gap on the upper side of the first electrical connection seat, the first electrical connection seat is firmly secured in the first recess.

7. A securing structure for the battery cartridge of a notebook-type computer as claimed in claim 5, wherein the second electrical connection seat is disposed on a lateral face of the first recess and the first electrical connection seat projects from a lateral side of the battery cartridge for electrically connecting with the second electrical connection seat in a face-to-face manner, a fitting body being disposed on an outer periphery of the first electrical connection seat, at least one channel being formed on an outer face of the fitting body, the movable latch body being composed of a latch board body and a shifting section above the latch board body, whereby after the first electrical connection seat is electrically connected with the second electrical connection seat, the latch board body is shifted by the shifting section to engage in the channel so that the first electrical connection seat is firmly secured in the first recess.

8. A securing structure for the battery cartridge of a notebook-type computer as claimed in claim 5, wherein the second electrical connection seat is disposed on a lateral face of the first recess and the first electrical connection seat projects from a lateral side of the battery cartridge for electrically connecting with the second electrical connection seat in a face-to-face manner, a fitting body being disposed on an outer periphery of the first electrical connection seat, at least one fixing hole being formed on an upper edge of the fitting body, the movable latch body being disposed with a hook section having an extending shifting section, whereby after the first electrical connection seat is electrically connected with the second electrical connection seat, the hook section is shifted to engage in the fixing hole so that the first electrical connection seat is firmly secured in the first recess.

9. A securing structure for the battery cartridge of a notebook-type computer, comprising:
a notebook-type computer one side of which is formed with a first recess in which a first electrical connection seat is disposed, at least one movable latch body being disposed on a periphery of the first recess; and
a battery cartridge for receiving a battery and supplying power for the computer, one side of the battery cartridge being disposed with a second electrical connection seat for electrically connecting with the first electrical connection seat, whereby after the battery cartridge is connected with the computer, the movable latch body is shifted to engage with the second electrical connection seat so as to firmly connect the second electrical connection seat with the first electrical connection seat, and wherein the other side other side of the battery cartridge is formed with a second recess in which a third connection seat is disposed for electrically connecting with a second electrical connection seat of another battery cartridge, at least one movable latch body being disposed on a periphery of the second recess, whereby after the battery cartridge is connected with the computer, at least one additional battery cartridge can be further connected with the battery cartridge to expand the power supply for the computer.

10. A securing structure for the battery cartridge of a notebook-type computer as claimed in claim 9, wherein one side of the computer is formed with a first latch section and the battery cartridge is formed with a second latch section corresponding to the first latch section, whereby after the battery cartridge is assembled with the computer, the first latch section is engaged with the second latch section so as to enhance the insertion force between the battery cartridge and the computer.

11. A securing structure for the battery cartridge of a notebook-type computer as claimed in claim 9, wherein the first electrical connection seat is disposed on the bottom of the first recess and the second electrical connection seat projects from a lateral side of the battery cartridge for electrically connecting with the first electrical connection seat in a vertically fitting manner, whereby after the second electrical connection seat is electrically connected with the first electrical connection seat, a gap is defined on an upper side of the second electrical connection seat, the movable latch body being composed of a latch board body and a shifting section above the latch board body, whereby when the latch board body is shifted by the shifting section to the gap on the upper side of the second electrical connection seat, the second electrical connection seat is firmly secured in the first recess.

12. A securing structure for the battery cartridge of a notebook-type computer as claimed in claim 9, wherein the first electrical connection seat is disposed on a lateral face of the first recess and the second electrical connection seat projects from a lateral side of the battery cartridge for electrically connecting with the first electrical connection seat in a face-to-face manner, a fitting body being disposed on an outer periphery of the second electrical connection seat, at least one channel being formed on an outer face of the fitting body, the movable latch body being composed of a latch board body and a shifting section above the latch board body, whereby after the second electrical connection seat is electrically connected with the first electrical connection seat, the latch board body is shifted by the shifting section to engage in the channel so that the second electrical connection seat is firmly secured in the first recess.

13. A securing structure for the battery cartridge of a notebook-type computer as claimed in claim 9, wherein the first electrical connection seat is disposed on a lateral face of the first recess and the second electrical connection seat projects from a lateral side of the battery cartridge for electrically connecting with the first electrical connection seat in a face-to-face manner, a fitting body being disposed on an outer periphery of the second electrical connection seat, at least one fixing hole being formed on an upper edge of the fitting body, the movable latch body being disposed with a hook section having an extending shifting section, whereby after the second electrical connection seat is electrically connected with the first electrical connection seat, the hook section is shifted to engage in the fixing hole so that the second electrical connection seat is firmly secured in the first recess.

14. A securing structure for the battery cartridge of a notebook-type computer, comprising:
   a notebook-type computer one side of which is disposed with a first electrical connection seat; and
   a battery cartridge for receiving a battery and supplying power for the computer, one side of the battery cartridge being formed with a first recess in which a second electrical connection seat is disposed for electrically connecting with the first electrical connection seat, at least one first movable latch body being disposed on a periphery of the first recess, whereby after the battery cartridge is connected with the computer, the first movable latch body is shifted to engage with the second electrical connection seat so as to firmly connect the second electrical connection seat with the first electrical connection seat, and
   wherein the other side other side of the battery cartridge is formed with a second recess in which a third connection seat is disposed for electrically connecting with a second electrical connection seat of another battery cartridge, at least one movable latch body being disposed on a periphery of the second recess, whereby after the battery cartridge is connected with the computer, at least one additional battery cartridge can be further connected with the battery cartridge to expand the power supply for the computer.

15. A securing structure for the battery cartridge of a notebook-type computer as claimed in claim 14, wherein one side of the computer is formed with a first latch section and the battery cartridge is formed with a second latch section corresponding to the first latch section, whereby after the battery cartridge is assembled with the computer, the first latch section is engaged with the second latch section so as to enhance the insertion force between the battery cartridge and the computer.

16. A securing structure for the battery cartridge of a notebook-type computer as claimed in claim 14, wherein the second electrical connection seat is disposed on the bottom of the first recess and the first electrical connection seat projects from a lateral side of the battery cartridge for electrically connecting with the second electrical connection seat in a vertically fitting manner, whereby after the first electrical connection seat is electrically connected with the second electrical connection seat, a gap is defined on an upper side of the first electrical connection seat, the movable latch body being composed of a latch board body and a shifting section above the latch board body, whereby when the latch board body is shifted by the shifting section to the gap on the upper side of the first electrical connection seat, the first electrical connection seat is firmly secured in the first recess.

17. A securing structure for the battery cartridge of a notebook-type computer as claimed in claim 14, wherein the second electrical connection seat is disposed on a lateral face of the first recess and the first electrical connection seat projects from a lateral side of the battery cartridge for electrically connecting with the second electrical connection seat in a face-to-face manner, a fitting body being disposed on an outer periphery of the first electrical connection seat, at least one channel being formed on an outer face of the fitting body, the movable latch body being composed of a latch board body and a shifting section above the latch board body, whereby after the first electrical connection seat is electrically connected with the second electrical connection seat, the latch board body is shifted by the shifting section to engage in the channel so that the first electrical connection seat is firmly secured in the first recess.

18. A securing structure for the battery cartridge of a notebook-type computer as claimed in claim 14, wherein the second electrical connection seat is disposed on a lateral face of the first recess and the first electrical connection seat projects from a lateral side of the battery cartridge for electrically connecting with the second electrical connection seat in a face-to-face manner, a fitting body being disposed on an outer periphery of the first electrical connection seat, at least one fixing hole being formed on an upper edge of the fitting body, the movable latch body being disposed with a hook section having an extending shifting section, whereby after the first electrical connection seat is electrically connected with the second electrical connection seat, the hook section is shifted to engage in the fixing hole so that the first electrical connection seat is firmly secured in the first recess.

* * * * *